United States Patent [19]

Narayan

[11] 4,228,095
[45] Oct. 14, 1980

[54] PROCESS FOR THE PREPARATION OF LIQUID CARBODIIMIDE-MODIFIED ORGANIC POLYISOCYANATES EMPLOYING ORGANOTIN CATALYSTS

[75] Inventor: Thirumurti Narayan, Grosse Ile, Mich.

[73] Assignee: BASF Wyandotte Corporation, Wyandotte, Mich.

[21] Appl. No.: 67,793

[22] Filed: Aug. 20, 1979

[51] Int. Cl.$^2$ .................................... C07C 119/055
[52] U.S. Cl. .................... 260/453 AM; 260/239 A; 260/453 AR; 260/453 SP; 521/901
[58] Field of Search ............... 260/453 AR, 453 AM, 260/453 SP; 521/901

[56] References Cited

U.S. PATENT DOCUMENTS

| | | | |
|---|---|---|---|
| 3,573,335 | 3/1971 | Yurimoto et al. | 260/453 AR |
| 4,088,665 | 5/1978 | Findeisen et al. | 260/453 AM |
| 4,143,063 | 3/1979 | Alberino et al. | 260/453 SP |
| 4,154,752 | 5/1979 | Sundermann et al. | 260/453 SP |

*Primary Examiner*—Dolph H. Torrence
*Attorney, Agent, or Firm*—Norbert M. Lisicki

[57] ABSTRACT

Carbodiimide-modified organic polyisocyanates are prepared by heating polyisocyanates in the presence of a catalytically sufficient amount of an organotin compound.

10 Claims, No Drawings

PROCESS FOR THE PREPARATION OF LIQUID CARBODIIMIDE-MODIFIED ORGANIC POLYISOCYANATES EMPLOYING ORGANOTIN CATALYSTS

BACKGROUND OF THE INVENTION

1. Field of the Invention

The present invention concerns carbodiimide-modified organic polyisocyanates. More particularly, the present invention relates to a process for preparing liquid carbodiimide-modified polyisocyanates employing organotin catalysts.

2. Prior Art

The prior art discloses a number of patents for the conversion of polyisocyanates containing carbodiimide groups employing various catalysts, among which, as disclosed in U.S. Pat. No. 4,085,140, is a co-catalyst system of cyclic phosphorus compounds and a tertiary amine. Another U.S. Pat. No. 3,640,966 discloses the preparation of polyisocyanates containing carbodiimides by employing catalytic amounts of a catalyst which is an organic isocyanate compound containing biuret, urea, amido, isocyanurate, uretedione, or uretonimine groups in the compound.

Still another patent, U.S. Pat. No. 3,670,502, claims a process for the preparation of carbodiimide-containing organic polyisocyanate by employing catalytic amounts of tris(chloromethyl)phosphine oxide. U.S. Pat. No. 3,449,256 claims the preparation of carbodiimide-modified polyisocyanates by heating the polyisocyanate with trihydrocarbyl phosphate.

U.S. Pat. No. 3,426,025 teaches a process for the preparation of organic carbodiimide-modified polyisocyanates by the use of a metallic derivative of an organic hydroxy compound which metal may be lithium, sodium, potassium, boron, titanium, hafnium, zirconium, niobium and silicon. U.S. Pat. No. 3,396,167 claims and teaches the preparation of isocyanurates by condensing a monoisocyanate in the presence of an organotin compound. None of the prior art teaches, or even suggests, that carbodiimide-containing organic polyisocyanates may be prepared by employing organotin compounds as taught by the instant invention.

SUMMARY OF THE INVENTION

Liquid carbodiimide-modified organic polyisocyanates are prepared by heating an organic polyisocyanate in the presence of a catalytically sufficient amount of a carbodiimide-forming catalyst that is an organotin compound at temperatures of 200° C. and greater. These products remain as clear liquids with little or no solids formation on prolonged storage at ambient temperature conditions. Infra-red analysis of the products indicate the presence of isocyanate-uretonimine structure which is the carbodiimide-isocyanate cyclo-addition product.

DESCRIPTION OF THE PREFERRED EMBODIMENTS

In accordance with the present invention, carbodiimide-modified organic polyisocyanates useful for the preparation of polyurethane foam products and the like are prepared by heating an organic polyisocyanate in the presence of a catalytically sufficient amount of an organotin compound. The catalyst is generally employed at a concentration ranging from 0.001 to 5.0 weight percent based on the weight of organic polyisocyanates. Preferably, the catalyst is employed at a concentration ranging from 0.1 to 1 weight percent based on the weight of the polyisocyanate. The temperatures employed are those over 200° C. Generally, the range is 200° to 250° C., preferably from about 200° to 230° C. The time required for carrying out this reaction is dependent upon the quantity of catalyst employed. However, the time can vary from about 0.5 hour to 6 hours. When the catalyst is employed in the preferred amount, reaction time ranges from 0.5 hour to 4 hours. After the required reaction time period has elapsed the resulting product is cooled to temperatures less than 30° C. Optionally, the reaction product may be treated at the reaction temperature or lower with catalyst deactivators which include acid chlorides such as benzoyl chlorides and acetyl chlorides, acids such as hydrochloric acid, oxalic acid, phosphoric acid, benzenesulfonic acid, or toluenesulfonic acid, sulfonyl chlorides such as benzenesulfonyl chloride, toluenesulfonyl chloride and the like. Other deactivators which may be employed are such agents as dimethylsulfate, alkyl, o,p-toluenesulfonate, methyl chloride and similar compounds as disclosed in U.S. Pat. No. 3,769,318. The products of this invention generally are low viscosity liquids at room temperature. The carbodiimide-modified organic polyisocyanates are useful in the preparation of rigid or flexible polyurethane foams. The rigid or flexible polyurethane foams in accordance herewith are prepared by reacting the carbodiimide-modified organic polyisocyanate and an active hydrogen-containing compound are well known to those skilled in the art.

The organic polyisocyanates which are advantageously employed in the present invention are represented by the formula:

$$R(NCO)_x$$ 

wherein R is a polyvalent organic radical selected from the group of aromatic and alkylaryl organic radicals as well as mixtures thereof, and x is an integer corresponding to the valence number of R and is at least 2. Representative of the organic polyisocyanates contemplated herein includes, for example, the aromatic diisocyanates, such as 2,4-toluene diisocyanate, 2,6-toluene diisocyanate, mixtures of 2,4- and 2,6-toluene diisocyanate, crude toluene diisocyanate, methylene diphenyl diisocyanate, crude polymethylene polyphenylene polyisocyanate and the like; the aromatic triisocyanates such as 4,4',4"-triphenylmethane triisocyanate, 2,4,6-toluene triisocyanate; the aromatic tetraisocyanates such as 4,4'-dimethyl-2,2',5,5'-diphenylmethanetetraisocyanate, and the like. Other organic polyisocyanates include m-phenylene diisocyanate, naphthylene-1,5-diisocyanate, 1-methoxyphenyl-2,4-diisocyanate, 4,4'-biphenyl diisocyanate, 3,3'-dimethoxy-4,4'-biphenyl diisocyanate, 3,3'-dimethyl-4,4'-biphenyl diisocyanate, and 3,3'-dimethyl-4,4'-diphenylmethane-diisocyanate. These polyisocyanates are prepared by conventional methods known in the art such as the phosgenation of the corresponding organic amines.

The organotin compounds which are employed in the present invention are both quadrivalent and divalent organotin compounds. The quadrivalent organotin compound may be described by the following formula:

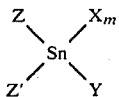

wherein Z and Z' are individually alkyl, aryl, alicyclic, heterocyclic, oxyalkyl or acyloxy group having from 1 to 18 carbon atoms and may be the same or different, X is an alkyl, aryl, alicyclic, heterocyclic, oxyalkyl, acyloxy, thioalkyl or thioalkylene acyloxy group having 1 to 18 carbon atoms, Y is equal to X or oxy groups or a group represented by the following formula:

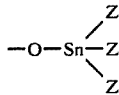

provided that when Y is this group, X is an alkyl or aryl group, m is equal to 1 except when Y is an oxy group then m is equal to 0, and a divalent organotin compound which may be described by the following formula:

Sn(OOCZ")$_2$ wherein Z" is alkyl, aryl, alicyclic, heterocyclic having from 1 to 18 carbon atoms.

Those quadrivalent organotin compounds which may be employed as described in the formula above, are dibutyltin dilaurate, dibutyltin diacetate, dibutyltin di(2-ethylhexanoate), dioctyltin dilaurate, dibutyltin maleate, di(n-octyl)tin maleate, bis(dibutylacetoxytin) oxide, bis(dibutyllauroyloxytin) oxide, dibutyltin dibutoxide, dibutyltin dimethoxide, dibutyltin disalicilate, dibutyltin bis(isooctylmaleate), dibutyltin bis(isopropylmaleate), dibutyltin oxide, tributyltin acetate, tributyltin isopropyl succinate, tributyltin linoleate, tributyltin nicotinate, dimethyltin dilaurate, dimethyltin oxide, dioctyltin oxide, bis(tributyltin) oxide, diphenyltin oxide, triphenyltin acetate, tri-n-propyltin acetate, tri-n-propyltin laurate, and bis(tri-n-propyltin) oxide, dibutyltin dilauryl mercaptide, dibutyltin bis(isooctylmercaptoacetate) and bis(triphenyltin)oxide. Those preferred are dibutyltin acetate, dibutyltin dilaurate, dibutyltin dilaurylmercaptide, dibutyltin bis(isooctylmercaptoacetate), dibutyltin oxide, bis(triphenyltin) oxide, bis(tri-n-butyltin) oxide. Those divalent organotin compounds which may be employed as catalysts as described in the formula above are: stannous oxalate, stannous oleate, stannous naphthenate, stannous acetate, stannous butyrate, stannous 2-ethylhexanoate, stannous laurate, stannous palmitate, and stannous stearate. The preferred divalent tin compounds are stannous oxalate, stannous oleate, and stannous 2-ethylhexanoate.

The following Examples illustrate the invention. All parts are by weight unless otherwise indicated. The physical properties of the foams were determined in accordance with the following ASTM tests:
Density—D-1622-63
Tensile Strength—D-1623-72
Elongation—D-412
Split Tear—D-470
Graves Tear—D-624
Shore "D" Hardness—D-676
Flex Recovery—D-1623-72
Flex Modulus—D-1623-72

The following abbreviations are employed in the Examples below:
Polyol A is a propylene and ethylene oxide adduct of trimethylolpropane having a molecular weight of about 6700 and containing 15 percent ethylene oxide.
Polyol B is a propylene and ethylene oxide adduct of propylene glycol having a molecular weight of about 6000 and containing 20 percent ethylene oxide.
Catalyst A is dibutyltin diacetate.
Catalyst B is stannous 2-ethylhexanoate.
Catalyst C is dibutyltin dilaurate.
Catalyst D is stannous oxalate.
Catalyst E is dibutyltin dilaurylmercaptide.
Catalyst F is dibutyltin bis(isooctylmercaptoacetate).
Catalyst G is dibutyltin oxide.
Catalyst H is bis(triphenyltin) oxide.
Catalyst I is bis(tri-n-butyltin) oxide.
Catalyst J is stannous oleate.
Catalyst K is a 25 percent by weight solution of triethylenediamine in 1,4-butanediol.
I-143L-MDI Modified isocyanate having a free isocyanate content of 29–30 percent known commercially as Isonate-143L (Upjohn).

EXAMPLE 1

A reactor equipped with a stirrer, thermometer, inlet for nitrogen gas, and a drierite packed tube was charged with 500 grams of molten 4,4'-diphenylmethane diisocyanate (MDI) and 0.25 part of Catalyst A under a nitrogen atmosphere. The reactor contents were heated to 220° C. and maintained thereat for two hours. At this stage, 0.2 gram of benzoyl chloride was added to deactivate the catalyst. The contents were then maintained at 220° C. for another 15 minutes after which the mixture was rapidly cooled to room temperature. The isocyanate content at the start of the heating cycle was 33.2 percent. After two hours, the isocyanate content was 30.2 percent. After overnight storage at ambient temperature, the isocyanate content was 29.7 percent and the product remained as a clear, amber-colored liquid. The stability was determined periodically and the isocyanate content was as tabulated below.

TABLE I

|  | NCO Content % | Viscosity cps. 25° C. |
|---|---|---|
| 8 days | 29.2 | 75 |
| 20 days | 29.2 | — |
| 37 days | 29.2 | 62 |
| 7 months | 28.9 | 75 |

After seven months, this product displayed a solid sediment of 0.28 percent.

COMPARATIVE EXAMPLE A

The procedure described in Example 1 was repeated in the absence of Catalyst A. The reactor contents were heated for five hours at 220° C. The isocyanate content of the reactor products were determined periodically as follows with the results listed in Table II below.

TABLE II

|  | NCO Content % |
|---|---|
| start | 33.2 |
| 0.5 hour | 32.8 |
| 1.5 hours | 32.6 |
| 3.5 hours | 32.1 |

TABLE II-continued

| | NCO Content % |
|---|---|
| 5.0 hours | 31.9 |

Thereafter, the reactor contents were cooled rapidly to room temperature. Crystalline solids commenced to precipitate and after overnight storage at ambient temperatures, the product contained about 75 percent solid crystalline material.

EXAMPLE 2

The procedure described in Example 1 was duplicated with the exception that the catalyst employed was Catalyst B. The isocyanate content was determined to be as listed in Table III below.

TABLE III

| | NCO Content % |
|---|---|
| start | 33.2 |
| 1 hour | 31.8 |
| 2 hours | 31.3 |
| 2.5 hours | 31.0 |

After two and one-half hours of heating, 0.25 gram of benzoyl chloride was added and the contents of the reactor were allowed to stir at 220° C. for another 15 minutes. Thereafter, the reactor contents were cooled rapidly to room temperature and stored at ambient temperature conditions.

After one day, the NCO content was 30.6 percent; after two days, the NCO percent was 30.7 with a viscosity of 55 cps at 25° C.; after 6 days, the NCO content was 30.5 percent, and after eight months, the NCO content was 30.4 percent with a viscosity of 60 cps at 25° C.

EXAMPLE 3

To a three-liter reaction vessel equipped with a stirrer, thermometer, inlet for nitrogen gas, and a drierite packed tube was added 2000 parts of molten MDI. The contents of the reactor were heated to 220° C. under a nitrogen blanket and 2.0 parts of Catalyst C was added. After heating for a period of 2.5 hours, the contents were rapidly cooled to room temperature and stored. The isocyanate content was determined to be as follows during the reaction and after storage:

TABLE IV

| | NCO Content % | Viscosity cps. 25° C. |
|---|---|---|
| Reaction | | |
| start | 33.2 | |
| 1 hour | 31.4 | |
| 2 hours | 30.3 | |
| 2.5 hours | 30.1 | |
| Storage | | |
| 2 days | 29.3 | |
| 7 days | 29.1 | |
| 63 days | 27.3 | 200 |
| 150 days | 25.6 | |

EXAMPLES 4–11

The procedure in Example 1 was duplicated with the exception as noted in Table V. These Examples illustrate the applicability of a variety of tin catalysts which are capable of converting isocyanates to carbodiimide-modified isocyanates.

TABLE V

| Example | Catalyst | Catalyst % | Reaction Temp., °C. | Reaction Time; Hrs | Final NCO; % | NCO, % after 1 day | Viscosity, cps. @25° C. after 1 day |
|---|---|---|---|---|---|---|---|
| 4 | C | 0.05 | 250 | 1.5 | 29.8 | 27.7 | 70 |
| 5 | D | 0.10 | 220 | 5.5 | 31.5 | 30.9 | 55 |
| 6 | E | 0.05 | 220 | 5.0 | 30.0 | 29.5 | 70 |
| 7 | F | 0.05 | 220 | 5.0 | 30.0 | 29.0 | 75 |
| 8 | G | 0.05 | 220 | 1.0 | 30.0 | 29.0 | 60 |
| 9 | H | 0.05 | 220 | 4.0 | 29.9 | 29.7 | 70 |
| 10 | I | 0.05 | 220 | 3.0 | 30.5 | 29.9 | 60 |
| 11 | J | 0.05 | 220 | 2.0 | 31.7 | — | — |

EXAMPLES 12–22

Microcellular elastomers were prepared employing the carbodiimide-modified isocyanate compositions of previous examples. In addition to the ingredients presented in Table VI, each formulation comprised 0.5 part of triethylenediamine and 0.02 part of dibutyltin dilaurate. All of the formulations utilized an NCO/OH ratio of 105.

TABLE VI

| Example | 12 | 13 | 14 | 15 | 16 | 17 | 18 | 19 | 20 | 21 | 22 |
|---|---|---|---|---|---|---|---|---|---|---|---|
| Polyol A, parts | 100 | 100 | 100 | 100 | 100 | 100 | — | — | — | — | — |
| Polyol B, parts | — | — | — | — | — | — | 100 | 100 | 100 | 100 | 100 |
| 1,4-Butanediol, parts | 20 | 20 | 20 | 25 | 25 | 25 | 20 | 20 | 20 | 25 | 25 |
| Composition of Example 1, parts | — | 66.7 | — | — | 77.6 | — | — | 66.8 | — | — | 77.8 |
| Composition of Example 3, parts | — | — | 66.7 | — | — | 77.6 | — | — | 66.8 | — | — |
| Isonate 143L, parts | 64.7 | — | — | 75.4 | — | — | 64.9 | — | — | 75.6 | — |
| Properties | | | | | | | | | | | |
| Density, pcf. | 61.3 | 65.0 | 60.7 | 62.0 | 65.3 | 62.9 | 62.3 | 62.0 | 61.0 | 61.9 | 61.5 |
| Tensile str., psi. | 1750 | 1800 | 1780 | 2200 | 2150 | 2230 | 1980 | 1950 | 1800 | 2130 | 2280 |
| Elongation, % | 80 | 70 | 90 | 70 | 60 | 70 | 150 | 120 | 120 | 70 | 90 |
| Split tear, pi. | 77 | 61 | 85 | 100 | 77 | 107 | 144 | 114 | 128 | 172 | 142 |
| Graves tear, pi. | 223 | 269 | 249 | 360 | 310 | 360 | 368 | 370 | 345 | 440 | 480 |
| Shore D | 51-42 | 51-42 | 48-41 | 58-52 | 54-50 | 54-49 | 51-44 | 49-40 | 46-37 | 58-50 | 56-50 |
| Heat sag, 250° F. | 0.40 | 0.49 | 0.30 | 0.18 | 0.30 | 0.22 | 0.36 | 0.32 | 0.22 | 0.18 | 0.22 |
| Flex recovery | 9/5 | 10/6 | 10/6 | 14/8 | 15/11 | 14/9 | 11/6 | 9/5 | 10/7 | 13/8 | 15/9 |
| Flex. modulus, psi. | | | | | | | | | | | |
| −20° F. | 36,225 | 43,418 | 36,479 | 67,392 | 65,588 | 58,509 | 29,077 | 53,430 | 36,972 | 62,914 | 86,161 |
| 72° F. | 14,678 | 17,695 | 15,860 | 27,875 | 30,746 | 29,292 | 15,868 | 20,161 | 14,182 | 30,223 | 36,340 |
| 150° F. | 8,988 | 10,076 | 10,133 | 18,071 | 19,996 | 17,478 | 9,690 | 11,387 | 8,856 | 18,026 | 20,497 |
| ratio −20° F./150° F. | 4.03 | 4.31 | 3.6 | 3.72 | 3.28 | 3.34 | 3.0 | 4.69 | 4.17 | 3.49 | 4.2 |

The embodiments of an invention in which an exclusive privilege or property is claimed are as follows:

1. A process for the preparation of a liquid carbodiimide-modified organic polyisocyanate comprising:
   a. heating an organic polyisocyanate to a temperature greater than 200° C. for a period ranging from 0.5 hour to 5 hours in the presence of a catalytically sufficient amount of an organotin compound selected from the group consisting of a quadrivalent organotin compound described by the following formula:

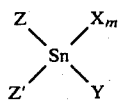

wherein Z and Z' are individually alkyl, aryl, alicyclic, heterocyclic, oxyalkyl or acyloxy group having from 1 to 18 carbon atoms and may be the same or different, X is an alkyl, aryl, alicyclic, heterocyclic, oxyalkyl, acyloxy, thioalkyl or thioalkylene acyloxy group having 1 to 18 carbon atoms, Y is equal to X or oxy groups or a group represented by the following formula:

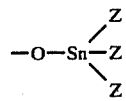

provided that when Y is this group, X is an alkyl or aryl group, m is equal to 1 except when Y is an oxy group then m is equal to 0, and
   a divalent organotin compound described by the following formula:

$Sn(OOCZ'')_2$ wherein Z'' is alkyl, aryl, alicyclic, heterocyclic having from 1 to 18 carbon atoms,
   b. stopping the reaction by cooling the product resulting from step (a) to a temperature of less than 30° C.

2. The process of claim 1 wherein the organotin compound is present in an amount ranging from 0.001 to 1.0 weight percent based on the weight of the organic polyisocyanate.

3. The process of claim 1 wherein the quadrivalent tin compounds are selected from the group consisting of dubutyltin diacetate, dibutyltin dilaurate, dibutyltin dilaurylmercaptide, dibutyltin bis(isooctylmercapto)acetate, dibutyltin oxide, bis(triphenyltin) oxide, and bis(tri-n-butyltin) oxide.

4. The process of claim 1 wherein the divalent organotin compound is selected from the group consisting of stannous 2-ethylhexanoate, stannous oxalate, and stannous oleate.

5. The process of claim 1 wherein the organic polyisocyanate is 4,4'-diphenylmethane diisocyanate.

6. The product according to the process of claim 1.
7. The product according to the process of claim 2.
8. The product according to the process of claim 3.
9. The product according to the process of claim 4.
10. The product according to the process of claim 5.